Nov. 21, 1939. C. B. PLETCHER Re. 21,275

BLAST GUN

Original Filed April 17, 1937 2 Sheets-Sheet 1

INVENTOR.
CLARENCE B. PLETCHER
BY McConkey Dawson & Booth
ATTORNEY.

Nov. 21, 1939. C. B. PLETCHER Re. 21,275

BLAST GUN

Original Filed April 17, 1937 2 Sheets-Sheet 2

INVENTOR.
CLARENCE B. PLETCHER
BY McCoubrey Dawson & Booth
ATTORNEYS.

Reissued Nov. 21, 1939

Re. 21,275

UNITED STATES PATENT OFFICE 21,275

BLAST GUN

Clarence B. Pletcher, Buchanan, Mich.

Original No. 2,107,084, dated February 1, 1938, Serial No. 137,576, April 17, 1937. Application for reissue April 28, 1938, Serial No. 204,924

5 Claims. (Cl. 51—11)

This invention relates to sand blasting guns of the type using a high pressure of water for forcing a mixture of the water, sand and air from the nozzle of the gun on to the work or surface to be cleaned or sand blasted.

An object of the present invention is to provide a blasting gun of the character above mentioned characterized by improved means for insuring a thorough mixing of the water, sand and air.

To this end the gun is provided with a chamber into which sand and air is drawn by suction and into which water under pressure is introduced in a manner to set up a turbulence within the chamber conducive to a thorough mixing of the water with the sand and air to the end that there will be no choking of the orifices and as would otherwise occur due to a lack of a proper mixing of the water and sand.

A further object of the invention is to provide for such a mixing of the water and sand that cleaning of the gun will be necessary only occasionally and only after long periods of use.

The invention together with its objects and advantages will be best understood from a study of the following description taken in connection with the accompanying drawings wherein.

Figure 1:
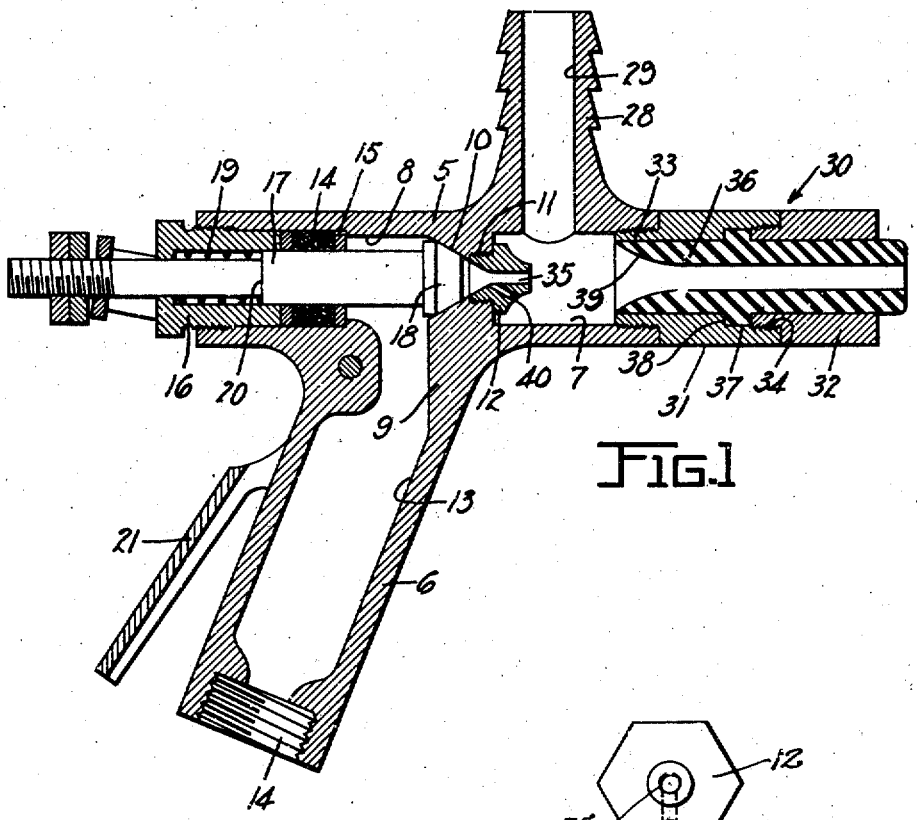
Figure 1 is a sectional view through a blast gun involving the features of the present invention.
Figure 2:
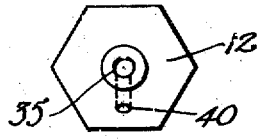
Figure 2 is an elevational view of a jet nozzle.

Referring to the drawings by reference numerals it will be seen that in the preferred embodiment thereof the gun comprises a barrel 5 having integral therewith a handle 6.

Barrel 5 is bored to provide a suction and mixing chamber 7 and a valve chamber 8. Chambers 7 and 8 are provided with a common or partition wall 9 that has a bore therethrough which bore has a conical end 10 forming a valve seat and a threaded end 11 into which latter end is threaded a jet nozzle 12.

The handle 6 is provided with a bore 13 that opens into the valve chamber 8 and at the free end thereof the handle 6 is provided with internal threads as at 14 for the coupling thereto of one end of a hose leading from a source of water under pressure.

Fitted within the end of the barrel 5 equipped with the chamber 8 is a packing assembly 14 held in place between an internal shoulder 15 and a hollow gland nut 16.

Having a working fit through the packing assembly 14 is a valve member 17 provided at one end with a frusto-conical head 18 normally engaging the seat 10. Housed within the hollow of the gland nut 16 is a coil spring 19 which at one end bears against a shoulder 20 on the valve member 17 in a manner to yieldably retain the valve head 18 engaged with its seat 10.

For retracting or unseating the valve 17 there is provided a handle 21 which is forked at one end and at said end straddles the gun handle 6 and is pivoted to the handle 6 at opposite sides of the latter as at 22.

Figure 3:
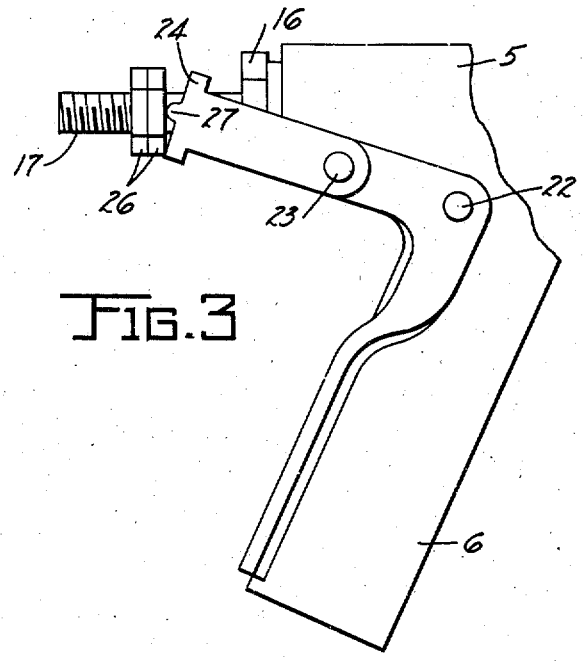
Figure 3 is an enlarged fragmentary side elevational view of the gun at the handle end thereof.
Figure 4:
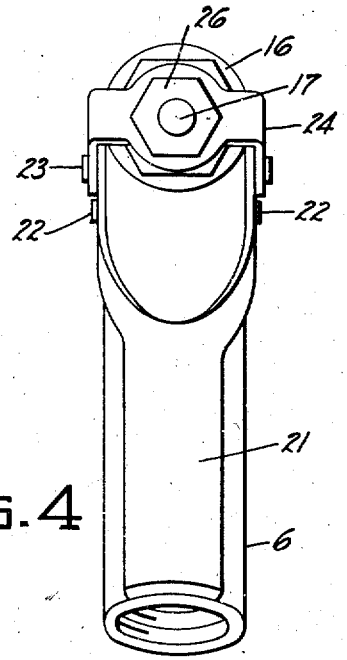
Figure 4 is an end elevational view of the gun viewing the same from the handle end thereof and Figure 5 is a perspective view of a yoke member.
Figure 5:
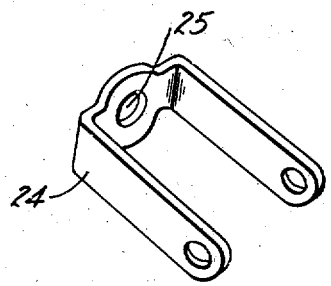

The legs of the handle 4 are substantially L-shaped as shown in Figure 3 and at their free ends are pivoted as at 23 to the legs of a yoke 24 that at its closed end is provided with an opening 25 which loosely accommodates the stem of the valve 17.

On the outer end thereof the stem of valve 17 is threaded to receive a pair of stop nuts 26 with which the closed end of the yoke 24 cooperates for retracting or unseating the valve. In this connection it will be noted that at the closed end thereof yoke 24 is provided with lugs or projections 27 that have bearing engagement with the nuts 26 in a manner shown in Figure 3 when the valve operating handle 21 is swung from the position shown in Figure 1 to the position shown in Figure 3 for unseating the valve 17. Obviously upon release of pressure on handle 21 spring 19 will operate to seat the valve 17. Thus it will be seen that the valve 17 may be controlled by the same hand holding the gun so that the other hand of the operator is left free.

The barrel 5 has formed integrally therewith and in the region of the chamber 7, a nipple 28 that is suitably corrugated and is adapted to have sleeved thereon one end of a hose or flexible conduit leading from a source of sand supply which is fed by air pressure to the chamber 7 of the gun through said hose and the bore 29 of the nipple 28. Due to the vacuum created in the chamber 7 by the water jet from nozzle 12, atmospheric air pressure is sufficient to feed the sand. The nipple 28 preferably extends from the top of the chamber 7 to prevent water from entering the hose and thereby clogging the sand feed.

For the gun there is also provided a nozzle indicated generally by the reference numeral 30. Discharge nozzle 30 comprises a pair of complemental sections 31, 32. Section 31 is provided at one end with a threaded pin 33 that threads into the chamber equipped end 7 of the gun barrel. At its other end nozzle section 31 is provided with internal threads to receive a threaded pin 34 formed integral with one end of the complemental nozzle section 32.

The bore of the nozzle 30 is materially larger than the bore 35 of jet nozzle 12 herein before referred to, and the bore of the nozzle 30 is lined by a tubing 36 of rubber or other suitable material formed intermediate its end with an integral shoulder 37 that is clamped between an internal shoulder 38 provided integral with the nozzle section 31 and the pin 34 of the nozzle section 32. At the intake end thereof the bore of the lining tube 36 is flared as at 39.

Nozzle 12 is relatively small and is provided at one end with a threaded portion that threads into the end 11 of the bore in the partition wall 9. The body of the nozzle 12 is provided with the aforementioned axial bore 35 which at the end thereof opening into chamber 8 is flared as shown.

Intermediate its ends the body of the nozzle 12 is provided with a diagonal port 40. Thus it will be seen that when valve 18 is unseated water from the source of supply passes through the passage 13 in handle 6 into the chamber 8 and from chamber 8 through the bore 35 of nozzle 12 into the chamber 7, certain of the water discharging in a stream into the chamber 7 through the port 40 in nozzle 12 in a manner to set up a turbulence and thoroughly agitate the mixture of the sand and air entering the chamber 7 to the end that the water entering the chamber 7 will be thoroughly mixed with said sand and air, the mixture of sand and water discharging under pressure through the nozzle 30 of the gun on to the surface to be cleaned.

This setting up of a turbulence within the chamber 7 will as above mentioned, not only insure a thorough mixing of the sand and water but will also preclude accumulations of wet sand about the nozzle 12, within the chamber 7, and within the bore of the nozzle 30 and as would tend to obstruct the free flow of water and sand from the gun.

It is thought that a clear understanding of the construction, utility and advantages of an invention of this character will be had without a more detailed description.

Having thus described the invention, what is claimed as new is:

1. In a sand blast gun, a barrel provided with a partition, said barrel having a valve chamber on one side of the partion and a vacuum and mixing chamber at the opposite side of the partition, means for supplying water under pressure to the valve chamber, valve means associated with said partition and controlling the passage of water under pressure from the valve chamber to the mixing chamber, a nozzle carried by the partition and controlled by the valve means and which is provided with an axial bore and with a diagonal passage divergent in the direction of flow through both of which water under pressure passes when permitted by the valve means, the diagonal passage serving to set up a turbulence in the mixing chamber, means for supplying sand to the mixing chamber, and a nozzle carried by said barrel for discharging mixed sand and water therefrom.

2. In a blast device, a barrel having valve and mixing chambers and having an inlet for water under pressure leading into the valve chamber and having a lateral inlet leading into the mixing chamber, a nozzle leading from the valve chamber to the mixing chamber which has an axial passage and a diagonal passage divergent in the direction of flow for a stream of water setting up turbulence in the mixing chamber, a valve controlling the nozzle, and means on the exterior of said device for operating said valve.

3. In a sand blast device, a part formed with a mixing chamber, means for supplying sand to said chamber, and valve-controlled means for supplying a stream of water under pressure to said chamber, said chamber having an outlet for mixed sand and water under pressure, said valve controlled means including means for discharging an auxiliary stream of water at an angle divergent in the direction of flow to the first named stream of water into the mixing chamber to induce turbulence therein to provide thorough mixing of the sand and water therein.

4. A blast device comprising a barrel formed with a mixing chamber and with an inlet for a stream of water under pressure at one side thereof and with an outlet at the opposite side thereof and with a lateral inlet discharging thereinto between said inlet and said outlet, said water inlet having means for discharging an auxiliary stream of water into the mixing chamber at an angle divergent in the direction of flow to the first-named stream of water to induce turbulence in the mixing chamber.

5. In a blast gun, a barrel provided with a partition, said barrel having a valve chamber on one side of the partition and a vacuum and mixing chamber at the opposite side of the partition, means for supplying water under pressure to the valve chamber, valve means associated with said partition and controlling the passage of water under pressure from the valve chamber to the mixing chamber, a nozzle carried by the partition and controlled by the valve means and which is provided with an axial bore and with a diagonal passage divergent in the direction of flow through both of which water under pressure passes when permitted by the valve means, the diagonal passage serving to set up a turbulence in the mixing chamber, an inlet opening at one side of the mixing chamber, and a discharge nozzle carried by said barrel.

CLARENCE B. PLETCHER.